United States Patent [19]

Handford

[11] Patent Number: 5,205,671
[45] Date of Patent: Apr. 27, 1993

[54] TRENCHLESS PIPELINE REPLACEMENT

[75] Inventor: Reginald G. Handford, Calgary, Canada

[73] Assignee: Trenchless Replacement Systems, Ltd., Calgary, Canada

[21] Appl. No.: 791,513

[22] Filed: Nov. 14, 1991

[51] Int. Cl.⁵ .............................................. F16L 1/00
[52] U.S. Cl. ...................................... 405/154; 175/62; 254/29 R; 405/184
[58] Field of Search ................. 405/154, 156, 184; 254/29 R; 173/53; 138/97; 175/62, 94

[56] References Cited

U.S. PATENT DOCUMENTS

| | | | |
|---|---|---|---|
| 4,505,302 | 3/1985 | Streatfield et al. | 138/97 |
| 4,507,019 | 3/1985 | Thompson | 405/154 |
| 4,626,134 | 12/1986 | Coumont | 405/184 |
| 4,637,756 | 1/1987 | Boles | 405/184 |
| 4,720,211 | 1/1988 | Streatfield et al. | 405/154 |
| 4,738,565 | 4/1988 | Streatfield et al. | 405/154 |
| 4,925,344 | 5/1990 | Peres et al. | 405/184 |
| 4,955,757 | 9/1990 | Balling | 405/184 |
| 5,015,124 | 5/1991 | Perry | 405/184 |

FOREIGN PATENT DOCUMENTS

| | | |
|---|---|---|
| 853926 | 10/1970 | Canada . |
| 1150520 | 7/1983 | Canada . |
| 1191356 | 8/1985 | Canada . |
| 1209356 | 8/1986 | Canada . |
| 1216276 | 1/1987 | Canada . |

OTHER PUBLICATIONS

Promotional brochure entitled "Expand-A-Line" put out by Sentry Piping Systems, Inc., date unknown.

*Primary Examiner*—Dennis L. Taylor
*Attorney, Agent, or Firm*—John Russell Uren

[57] ABSTRACT

A method of replacing an existing underground pipe (44) with a new pipe (48) comprises the steps of moving a pipe removing tool (70) along the existing pipe (44) to remove the existing pipe and dragging the new pipe (48) behind the tool (70) to replace the existing pipe while imparting vibratory motion to the tool (70) or continuously applying a dressing material ahead of the new pipe to act as lubricant or to fill in the annular space between the new pipe and the surrounding soil. According to another embodiment, the method comprises the steps of pushing out the old pipe (126) in one direction by means of a pipe removing tool (110) connected to a hydraulic unit (10) through a stem and replacing the old pipe (126) by means of a new pipe (48) by dragging the new pipe along behind the stem moving in the opposite direction during a return run. Pipe removing tools (70, 110) are further provided which are capable either of fracturing the old pipe or extracting the old pipe and having chambers (86) for feeding a lubricating or filter material or provided with a vibrator (105) therein. A hydraulic unit (10) for driving the pipe removing tools is also provided which is associated with apparatus (40) for gripping and rotating the stem to effect assembly or disassembly of the stem from individual screw-threaded pipe sections (38).

5 Claims, 9 Drawing Sheets

TRENCHLESS PIPELINE REPLACEMENT

FIELD OF THE INVENTION

This invention relates to the replacement of pipes, such as water, gas, oil, sewer, transmission pipes, and the like, with new piping without digging a trench along the entire length of the pipe being replaced. In particular, the invention relates to tools which are suitable for use in the trenchless replacement of pipes, as well as a hydraulic unit for use with the pipe replacement tools.

BACKGROUND OF THE INVENTION

The broad division in trenchless pipeline rehabilitation is between liner systems, which involve placing a liner or a new pipe inside an existing old pipe which is to be renewed, and trenchless replacement methods by which an old pipe is replaced by a new one of a size equal to or greater than that of the original pipe. This invention relates particularly to the latter type application.

Replacement methods differentiate between pipe bursting methods, whereby the old pipe is destroyed or broken up underground prior to laying of the new pipe and pipe-extraction methods where the old pipe is removed from underground before laying the new pipe.

In the pipe bursting method a tool which is of greater outer diameter than both the internal diameter of the old pipe and the outer diameter of the new pipe is advanced along the inside of the old pipe whilst towing the new pipeline behind it. This breaks up the old pipe driving the fragments into the surrounding soil and creates a tunnel into which the new pipe is installed. The pipe bursting method can be readily employed to replace old ceramic, asbestos, cement or concrete sewer lines, i.e. any pipeline made of a friable material.

In the pipe extraction method the old pipe is not broken up but is removed from the pipe zone under ground before installation of the new pipe. Pipe extraction is used to replace metal pipelines which are not amenable to pipe bursting and where the extraction has the advantage that metal shards are not left behind in the ground to damage the new pipeline being installed.

It is an object of the present invention to provide a pipe replacement system which can be used in both the pipe bursting and pipe extraction methods.

SUMMARY OF THE INVENTION

According to one aspect of the invention, there is provided a method of replacing an existing underground pipe with a new pipe, comprising the steps of moving a pipe removing tool along a line extending substantially coaxially with said existing pipe to remove said existing pipe from its position along said line; applying a vibratory motion to said tool during said movement; and dragging a new pipe to replace said old pipe along said line by means of said tool.

According to another aspect of the invention, there is provided a method of removing an existing underground pipe, comprising the steps of placing a pipe removing tool in abutment with one end of the existing pipe; connecting the pipe removing tool through a length of adjustable stem to a hydraulic unit; exerting successive pushing forces on said pipe removing tool through said stem by means of said hydraulic unit to intermittently push the existing pipe longitudinally ahead of said tool; and proportionately increasing the length of said stem after the application of each of said pushing forces.

Also according to the invention, there is provided a method of replacing an existing underground pipe with a new pipe, comprising the steps of providing pits at the opposite ends of said existing pipe to expose said opposite ends; placing a pipe removing tool in abutment with one end of the existing pipe; connecting the pipe removing tool through a length of adjustable stem to a hydraulic unit; exerting successive pushing forces on said pipe removing tool through said stem by means of said hydraulic unit to intermittently push the existing pipe longitudinally ahead of said tool; proportionately increasing the length of said stem after the application of such pushing forces until the tool reaches the opposite pit; attaching the new pipe to the tool at said opposite pit; exerting successive pulling forces on said pipe removing tool to intermittently pull said new pipe toward said first pit; and proportionately decreasing the length of said stem after the application of each of said pulling forces.

According to a further aspect of the invention, there is provided a pipe removing tool comprising a substantially cylindrical member having a first end for insertion into an existing underground pipe which is to be removed and a circumferential flange spaced from said first end for abutment against the end of said existing pipe and a second end for connection to a stem for attachment to a hydraulic unit for effecting successive longitudinal pushing forces on said tool.

According to another aspect of the invention, there is provided a pipe removing tool for movement along the length of an existing underground pipe to break up said existing pipe into fragments, which comprises an elongate member having a substantially cylindrical rear portion and a conical front portion; means on said front portion for connection to a stem for pulling the tool along said existing pipe to effect said fracturing of the existing pipe; and a chamber on said rear portion for containing a dressing material and exit ports for feeding dressing material from said chamber into an area externally of said tool.

According to a further aspect of the invention, there is provided a pipe removing tool for movement along the length of an existing underground pipe to break up said existing pipe into fragments, which comprises an elongate member having a substantially cylindrical rear portion and a conical front portion; means on said front portion for connection to a stem for pulling the tool along said existing pipe to effect said fracturing of the existing pipe; and vibratory means mounted on the inside of said tool for imparting a vibratory motion to said tool.

According to yet a further aspect of the invention, there is provided a hydraulic apparatus comprising a stationary frame portion; a moving frame portion capable of performing sliding movement relative to said stationary frame portion between a pair of limiting positions; hydraulic cylinder means between said stationary and said moving frame portions for effecting movement of said moving frame portion between said limiting positions; connection means on said movable frame portion for connection to a stem attached to a pipe removing tool; and means associated with said movable frame portion for gripping and rotating said stem to effect assembly of said stem from individual screwthreaded stem portions or disassembly of the stem into said individual stem portions.

Further objects and advantages of the invention will become apparent from the description of a preferred embodiment of the invention below.

BRIEF DESCRIPTION OF THE DRAWINGS

The invention will now be described, by way of examples, with reference to the accompanying drawings, in which.

DETAILED DESCRIPTION

Figure 1:
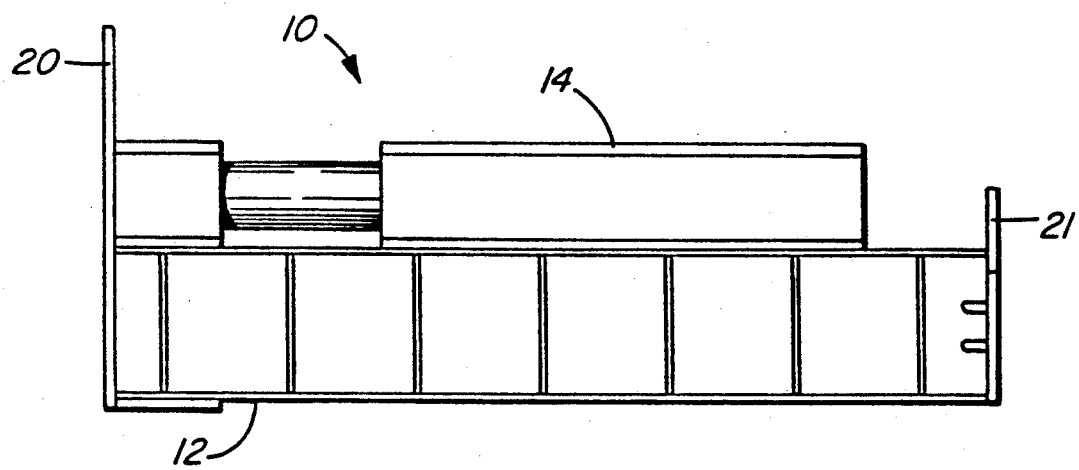
FIG. 1 is a side view of a hydraulic unit for use with pipe replacement tools according to the invention.
Figure 2:
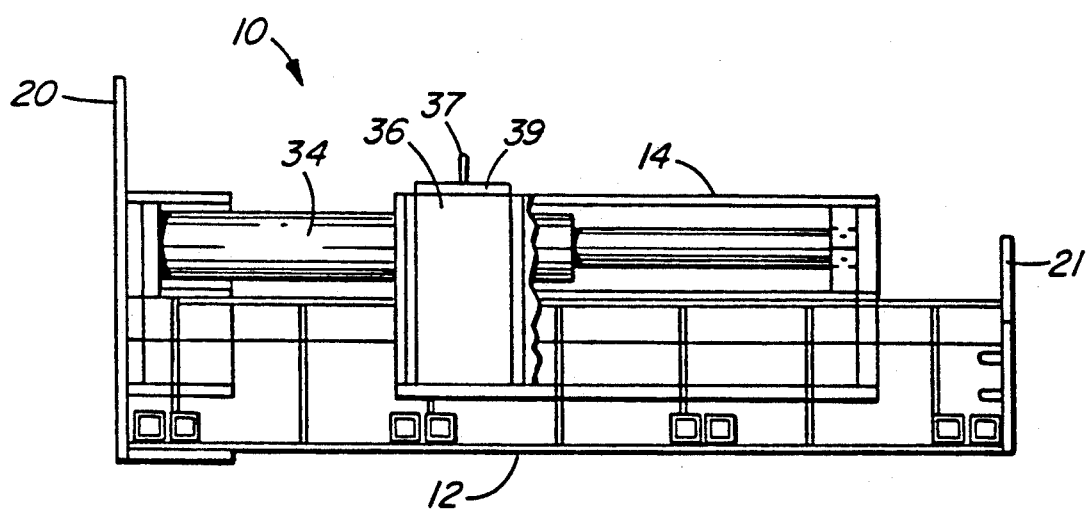
FIG. 2 is a side view similar to FIG. 1 but with some parts of the hydraulic unit cut away to show internal detail.

In FIGS. 1 and 2, reference numeral 10 generally indicates a hydraulic unit comprising a stationary frame portion 12 and a moving frame portion or train 14.

Figure 4:
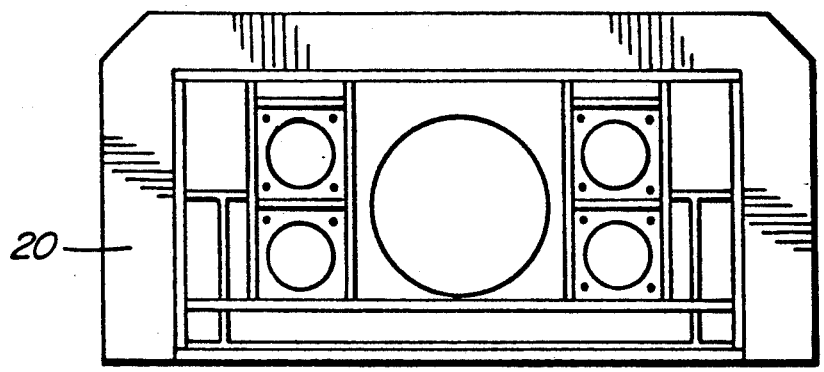
FIG. 4 is an end elevation of a butt section of the hydraulic unit of FIG. 1.
Figure 7:
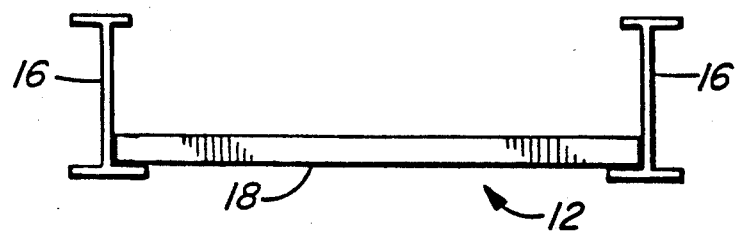
FIG. 7 shows an end elevation of a stationary frame portion of the unit of FIG. 1.
Figure 8:
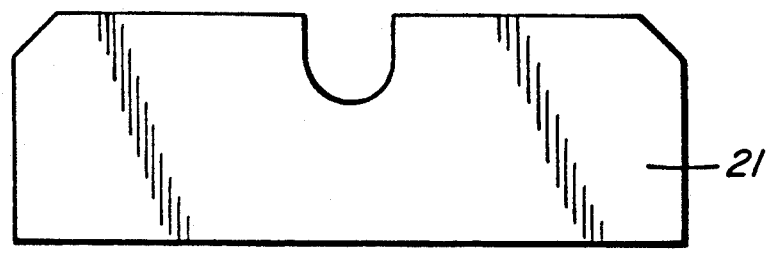
FIG. 8 is a plan view of a back plate of the hydraulic unit of FIG. 1.

The stationary frame portion 12 comprises a pair of metal beams 16 attached to a metal base 18 in parallel spaced relationship, as shown in FIG. 7, and connected to a head plate 20 (FIG. 4) at one end and a back plate 21 (FIG. 8) at the other end.

Figure 3:
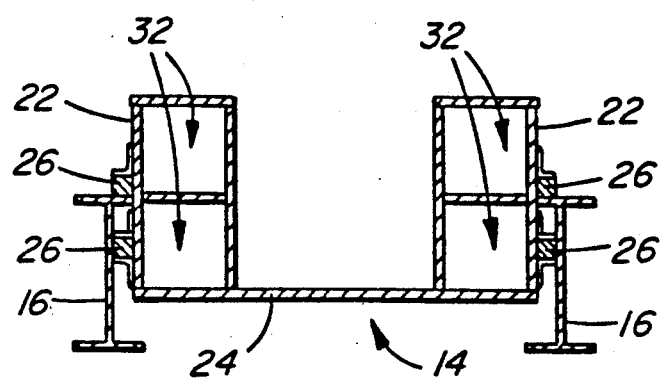
FIG. 3 is a cross-section through the hydraulic unit of FIG. 1 showing its framework and with other parts, such as its hydraulic cylinders, omitted.
Figure 6:
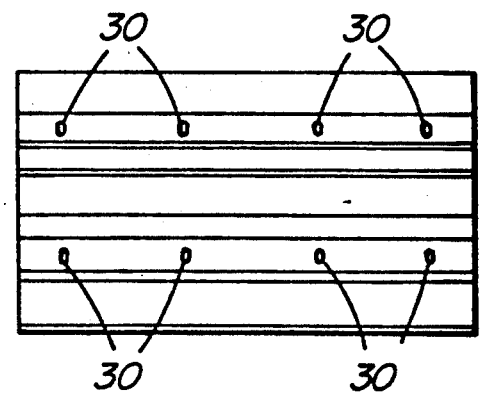
FIG. 6 is a side view of the train section of FIG. 5.

The train 14 comprises a pair of elongate side sections 22 connected to a base plate 24 in parallel spaced relationship, as shown in FIG. 3. The side sections 22 are provided with hardwood sliders 26 for sliding along a guide rail 28 provided on the beams 16 of the stationary frame portion 12. A side view of one side section 22, showing elongated bolt holes 30 for attachment of the sliders 26, is shown in FIG. 6. The holes 30 are elongated to allow for adjustment.

Figure 5:
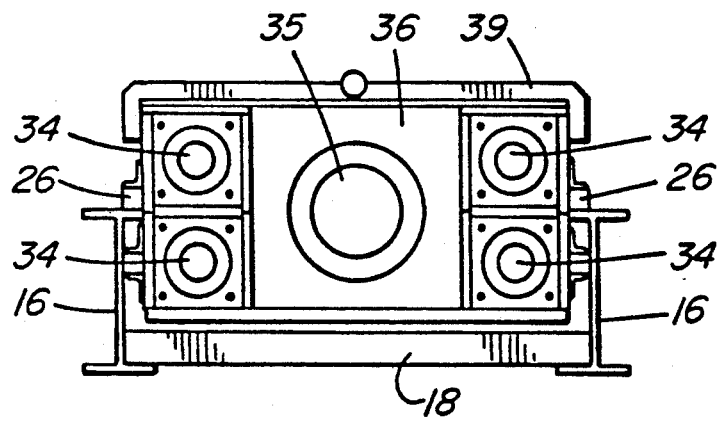
FIG. 5 is an end elevation of a train section of the unit of FIG. 1.

Each of the side sections 24 is divided into a pair of rectangular enclosures 32 in which the four hydraulic cylinders 34 powering the hydraulic unit 10 are located (FIG. 5). Only one of the hydraulic cylinders 34 is shown in FIG. 2.

A bushing or slip bowl 36 is provided for use with the unit 10. The slip bowl 36 essentially comprises a metallic block into which is machined a conical opening 35 (FIG. 9) which serves as a bushing for receiving a set of slips, as will be described below. The slip bowl 36 is removably located on the train 14 for movement therewith, and it cooperates with vertical guide rails (not shown) on the train 14 for locating it in position, as shown in FIG. 2. To secure the slip bowl 36 in position, a plate 39 is bolted across its top. The slip bowl 36 can be located at either end of the train 14 with the taper of the opening 35 facing in either the one or the other direction, depending on whether a pulling or pushing force is being applied. It has a lifting eye 37 on top to facilitate handling thereof. When secured in position on the train 14, the opening 35 is located centrally of the hydraulic cylinders 34, as shown in FIG. 5.

The slip bowl 36 receives a set of slips (not shown) for attachment to a stem formed from heavy wall high tensile steel tubing or pipe sections 38, serving as a "pull string". The pipe sections 38 can be of any convenient length, such as 4' and have an internal thread (box thread) at one end 42 and a mating external thread (pin thread) 43 at the other end so that a plurality of the sections can be connected together to form a stem or "pull string" of variable length. A suitable thread for this application has been found to be a 3½ IF thread. The threads 42 and 43 are preferably tapered threads. The outer diameter (OD) and inner diameter (ID) of the pipe sections will vary as to the application and three different sizes can be provided, such as 1½" OD, ¾" ID; 3½" OD, 2¼" ID; and 6" OD, 2¼" ID.

Figure 10:
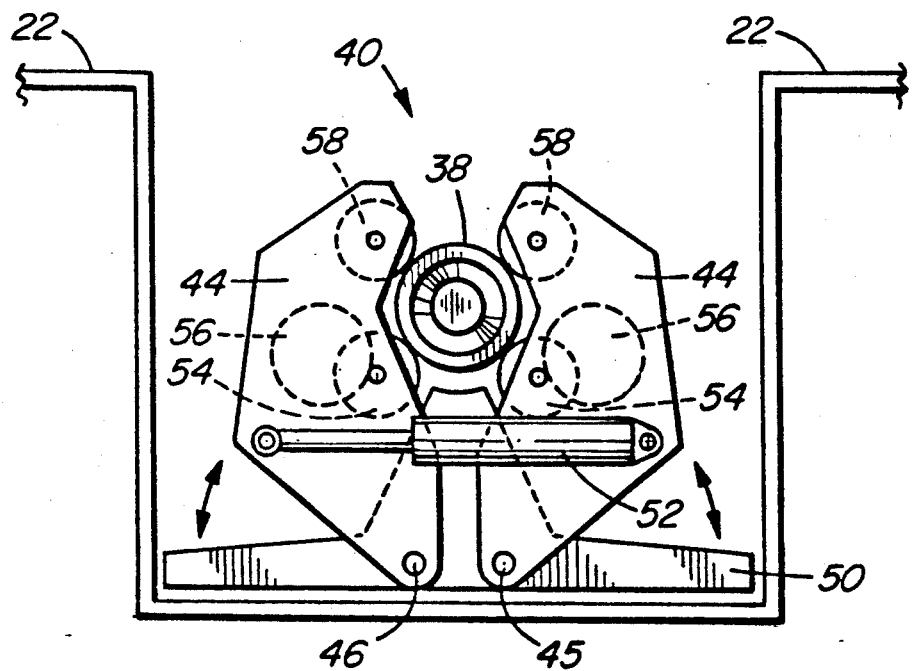
FIG. 10 is an end view as viewed from the rear of the train section of a rod spinner assembly for use with the unit of FIG. 1.
Figure 11:
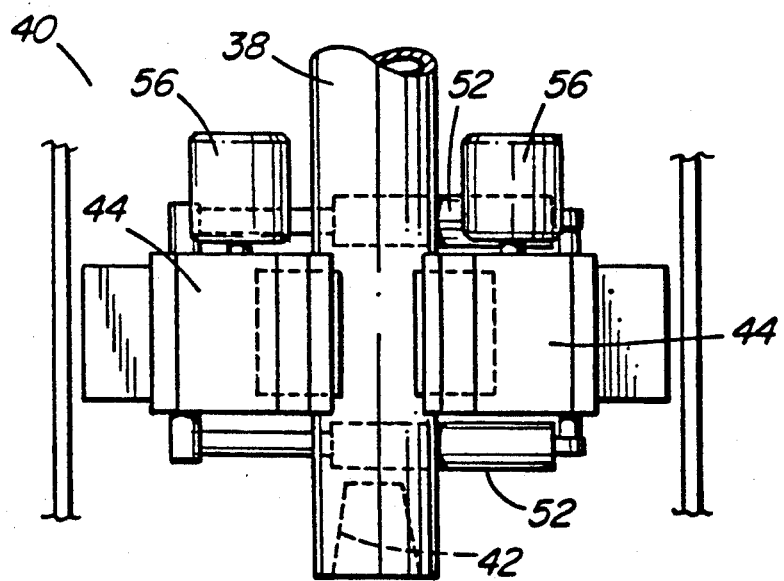
FIG. 11 is a plan view of the spinner assembly of FIG. 10.

A spinner assembly, generally indicated at 40 in FIGS. 10 and 11, is provided for handling the assembly and disassembly of pipe sections 38 to form the stem. The purpose of the spinner assembly 40 is to grip and rotate the pipe sections 38 to effect the assembly and disassembly thereof.

As shown the assembly 40 comprises a pair of jaws 44 which are pivotally connected at 46 and 48, respectively, to a base 50. A pair of hydraulic cylinders 52 are provided on opposite sides of the jaws 44 and operate to open and close the jaws 44. The jaws 44 are shown in the closed position in FIG. 10.

The spinner assembly 40 further comprises a pair of aluminum drive rollers 54, driven by hydraulic motors 54, either direct or through suitable gears, and a pair of steel compression idler rollers 58. The drive rollers 54 and the idler rollers 58 are all rotatably connected to the jaws 44, together with the hydraulic motors 54.

The spinner assembly 40 is a separate unit from the unit 10 and is loosely placed on the train 14 between the side members 22, as shown in FIG. 10. It is located at a level slightly lower than the pipe sections 38 so that it does not interfere with them during movement of the stem. This is the situation when the jaws 44 are in the open position.

Figure 9:
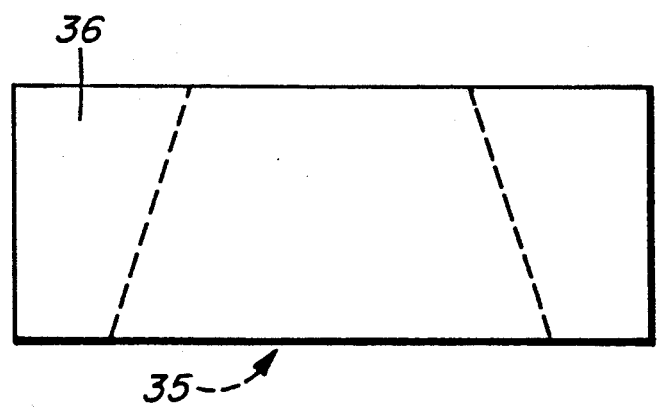
FIG. 9 is a top view of a slip bowl or bushing for use with the hydraulic unit of FIG. 1.

When the jaws 44 are closed around a pipe section 38 to bring the rollers 54, 58 into contact with the pipe section 38, as shown in FIG. 9, the spinner assembly 40 is lifted from its resting position on the train 14. This allows the spinner assembly 40 to travel back and forth in a longitudinal direction with the pipe section 38 during assembly or disassembly of the stem.

With the jaws 44 in the closed position, the hydraulic motors 56 drive the rollers 54 to rotate the pipe section 3B in either one or the other direction as required for assembly or disassembly.

Figure 12:
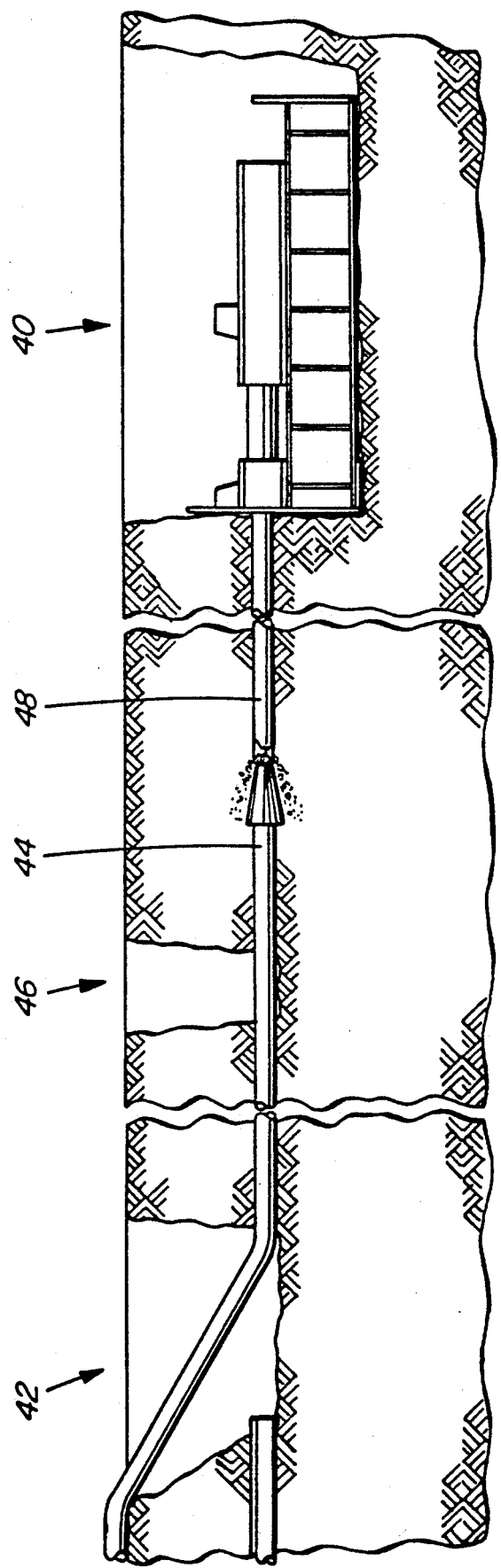
FIG. 12 is a side view showing the hydraulic unit of FIG. 1 in place in a pipe bursting and replacement installation.
Figure 13:
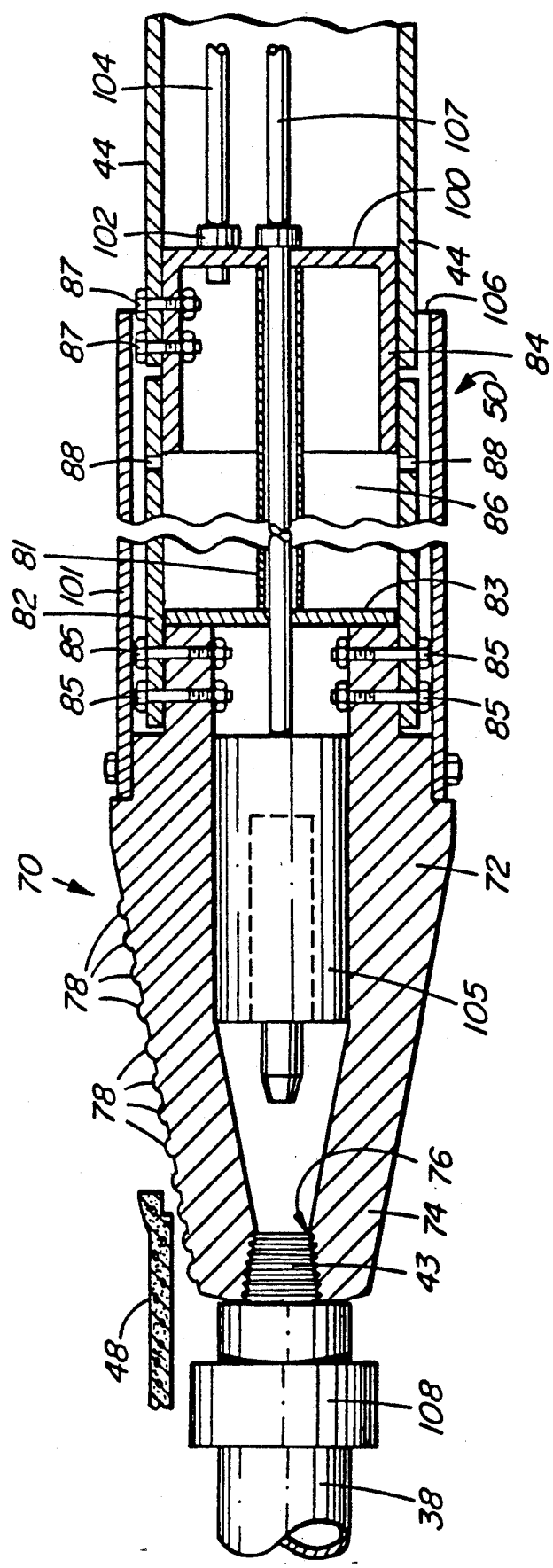
FIG. 13 is a sectional side view of a pipe replacement tool according to one aspect of the invention.
Figure 14:
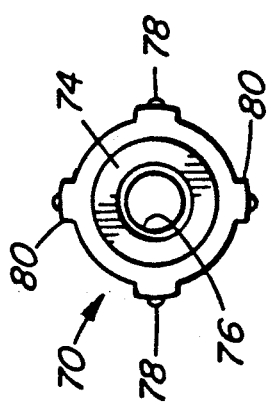
FIG. 14 is a front end view, on a smaller scale, of the pipe replacement tool of FIG. 13.

Referring now to FIGS. 13 and 14, a pipe replacement tool 70 is shown for use in applications where the existing pipe 48 is fractured into the surrounding soil prior to laying of the new pipe 44 (See FIG. 12). As stated before, this is normally done in the case of ceramic or cementitious pipes, or even in the case of metal pipe which is so corroded that removal thereof is not feasible.

The tool 70 comprises a machined steel body member having a cylindrical rear portion 72 and a tapered front portion 74. At its front end it is provided with a screw threaded opening 76 for receiving the screw threaded end 43 of a pipe section 38.

Depending on the type of application for which the tool 70 is intended, it has carbide tips 78 thereon, as shown in the upper part of FIG. 12, or it is smooth, as shown in the lower part of FIG. 12. As shown in FIG. 13, the carbide tips 78 are provided along circumferentially spaced longitudinally extending raised portions 80. The carbide tipped tool 70 is used for fracturing concrete piping. When the tool 70 is without the carbide tip 78, it is intended for use with ceramic piping. However, a carbide tipped tool may also be used in these latter applications. The raised portions 80 are not required on the tool 70 when the carbide tips 78 are omitted.

At the rear end of the tool 70 there is provided a feeder or dresser attachment 80 for feeding a dressing material into the underground tunnel when laying a new pipe. For example, in highly resistant ground conditions, a bentonite feed can be provided ahead of the new pipe as a lubricant to assist installation. Instead of bentonite, another suitable lubricating gel can be used. The lubricant can also serve as a filler material to fill the annular space around the new pipe and the underground tunnel in which the pipe is being laid, e.g. in cases where a plastic pipe is being laid. Alternatively, a thin cementitious slurry can be provided to fill the annular space.

The feeder attachment 80 comprises a pair of cylindrical telescoping members 82 and 84 defining a feeding or dresser chamber 86 between them. A sealing plate 83 is provided on the attachment 80 to seal off the chamber 86 from the hollow interior of the tool 70. Dresser ports 88 are provided for feeding the dressing material into the underground tunnel. Several rows of these dresser ports 88 can be provided around the circumference of the chamber 86 as required for the particular soil conditions.

The outer cylindrical member 82 is connected to the rear of the tool 70 by means of bolts 85. A second set of bolts 87 connect the members 82 and 84 together and also serve to connect the new pipe 44 which is being installed to the rear of the member 84.

The inner cylindrical member 84 has a rear plate 100 to which is connected an inlet connection 102 for introducing the dressing material into the dresser chamber 86. A dressing material supply line 104 extends from the inlet connection 102 along the inside of the new pipe 44 to a supply reservoir (not shown) from where the dressing material is pumped under pressure into the chamber 86. Thus the dressing material is maintained under pressure in the chamber 86 so that it will be expelled through the ports 88 into the annular space around the new pipe 44. The dressing material reservoir and pump for pumping the dressing material are conveniently located on a wheeled carriage (not shown) for movement along with the new pipe as the pipe is pulled along with the tool 70.

A sleeve 101 is bolted to the rear end of the tool 70 to define an annular feeding space 103 around the dresser ports 88 to create a more uniform flow of the dressing material and also to counteract the ports 88 from becoming clogged by dirt or debris. The dressing material exits through the annular opening 106 at the rear end of the sleeve 101.

In situations where dressing is not required, the dresser attachment 80 can be omitted and the new pipe 44 can be connected directly behind the tool 70.

A vibrator is installed in the tool 70 to impart vibratory motion thereto. It has been found that vibration decreases friction on the tool, thereby decreasing the need for full power on the hydraulic apparatus 10. It also assists in the compaction of the soil around the tool 70. The type of vibrator which has been found to be suitable for this purpose is a high speed pneumatic vibrator 105, as schematically illustrated in FIG. 13, similar to the type used on storage hoppers, etc., to detach materials from the walls of the hopper. The capacity of such a vibrator is measured by the effect it has on the number of tons of material it will suspend in a hopper. For the present application a vibrator of the type capable of suspending or moving 150 tons has been found to be suitable. The vibrator 105 is bolted to the housing of the tool 70. A pneumatic line 107 extending along the pipe 44 being towed is connected to the vibrator 105. A sleeve 81 is provided around the pneumatic line 107 to seal the chamber 86 from the line 107

Figure 15:
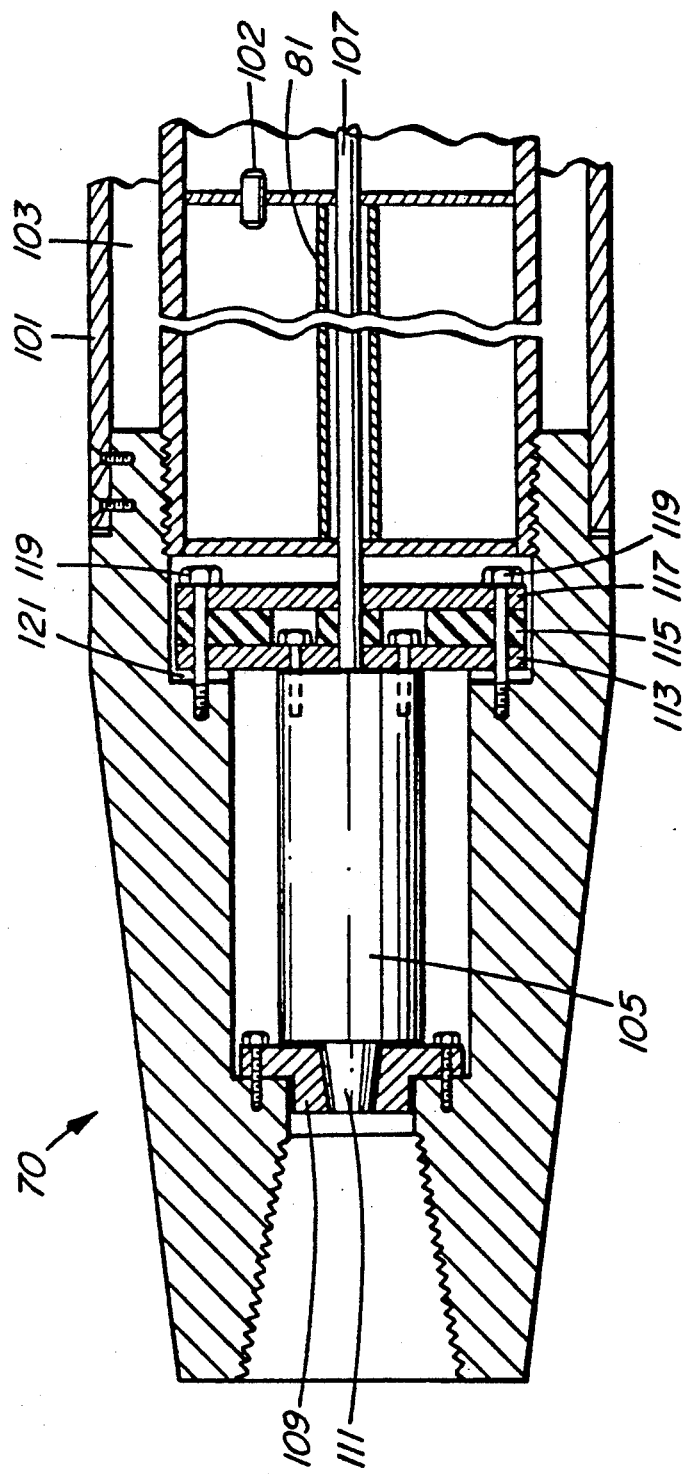
FIG. 15 is a sectional side view of a pipe replacement tool somewhat similar to the embodiment shown in FIG. 13 and showing more detail regarding the attachment of a vibrator to the inside of the tool.

Referring to FIG. 15, the attachment of the vibrator 105 to the inside of the tool 70 is shown in greater detail. The tool shown in FIG. 15 is also referenced 70 although it has a slightly different interior configuration than the tool shown in FIG. 13. In order to attach the vibrator 105 to the tool 70, a cone flange 109 is bolted to the inside of the tool 70. The cone flange 109 has a 7° slope for accepting the vibrator shaft 111, as shown. Three members 113, 115 and 117 are provided behind the vibrator 105, the first being a round metal plate to which the vibrator 105 is bolted, the second being an insulator pad of hard rubber and the third being a round metal backplate. The members 113, 115 and 117 are bolted to the tool 70 by means of a plurality of circumferentially arranged bolts 119. The bolted members 113, 115 and 117 press the vibrator shaft 111 into firm engagement with the cone flange 109 to secure the vibrator 105 in place. The arrangement is such that a space of about ¼" is provided between the metal plate 113 and the tool 70, as shown at 121.

A cushion sub 108 to allow longitudinal expansion and contraction between the tool 70 and the hydraulic unit 10 to isolate the tool 70 and the pipe 44 from shock from the hydraulic unit 70, as well as to counteract the vibratory motion of the tool 10 from being transferred to the hydraulic unit 10, can also be provided. The cushion sub 108 is shown in block form in FIG. 13 and is well known in the art and will not be described in any further detail here.

During a pipe replacement operation, two pits 40 and 42 are dug spaced apart along the length of the pipe 48 to be replaced, as shown in FIG. 12. The extent to which the pits 40 and 42 can be spaced from each other is determined inter alia by the power output of the hydraulic unit 10.

The hydraulic unit 10 is installed in the one pit 40, referred to as the jacking pit. The other pit 42, from where a new pipe 44 is inserted, is referred to as the insertion pit.

Depending on the length of pipe 48 to be replaced, a plurality of jacking pits 40 will be excavated along the length of the pipe 48. Where possible, the jacking pits 40 are sited at points where excavation would in any event be necessary to renew valve assemblies, hydrant leads and similar items. Holes for service connections, such as shown at 46 in FIG. 12, are typically augured or excavated by any other suitable equipment, such as a hydraulically driven vacuum, to 1.22 m diameter or dug to 1.22 m to 2 m by 1 m by pneumatic or standard methods. The pipe insertion pits 42 need only be slightly wider than the new pipe 44 itself.

The hydraulic unit 10 is located in the jacking pit 40 so that the centreline of the slip bowl 36 is lined up with the centre of the existing pipe 48. In the example shown in FIG. 12, the existing pipe 48 is a ceramic sewage pipe.

Depending on the size of the existing pipe 48, one of the three sizes of pipe sections 38, referred to above, i.e. 1¼" OD, ¾" ID; 3½" OD, 2¼" ID; or 6" OD, 2¼" ID can be selected. The pipe sections 38 are inserted from the jacking pit 40 towards the insertion pit 42 through the existing pipe 48 and assembled, as they are inserted one after the other, by means of the spinner assembly 40 to form a stem which will serve as a "pull string".

When the stem has reached the insertion pit 42, the tool 70 is attached to the free end of the forwardmost pipe section 38 by screwing it onto the screw threaded portion 43, as shown in FIG. 13. The new pipe 44 is attached to the rear of the tool 70 either directly or through the intermediary of the dressing attachment 80 as shown in FIG. 13, depending on whether dressing is required or not. In the present example a bentonite dressing is applied. The dressing is supplied as a gel comprising a mixture of bentonite and water which is supplied along the feed line 104 and into the chamber 86 under pressure.

The pipe section 38 forming the other end of the stem is secured by the slip and the process begins by "jacking" the tool 70 back towards the jacking pit 40.

This is affected by successive strokes performed by the hydraulic cylinders 34. As the tool 70 is pulled through the old pipe 48, the old pipe 48 is broken up and the new pipe 44, which is pulled along behind the tool 70, is laid in its place. At the same time, the bentonite dressing gel is forced out through the ports 88 and into the annular space around the new pipe 44 to lubricate the pipe 44 as well as to create a bedding for the new pipe. The gel used in the present example is selected so that it cures to a consistency of approximately 2 to 5 M.P.A., or as required by engineer's specification.

Figure 16:
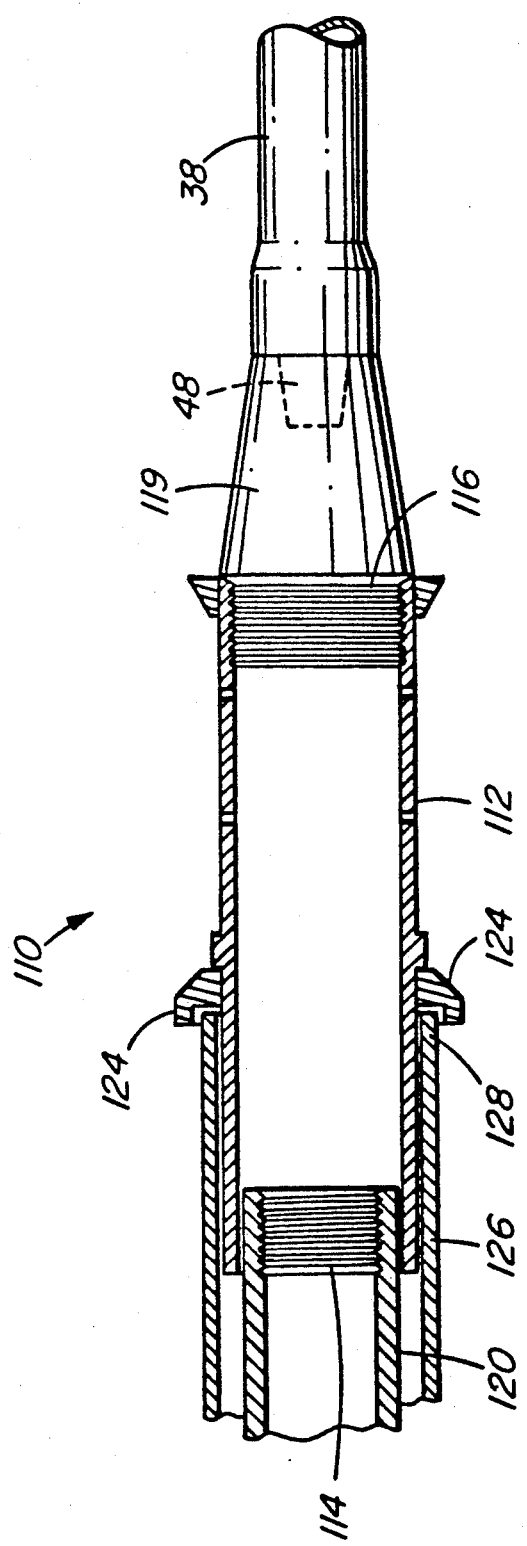
FIG. 16 is a sectional side view of a pipe replacement and extraction tool according to another aspect of the invention, shown in a pipe removing application.
Figure 17:
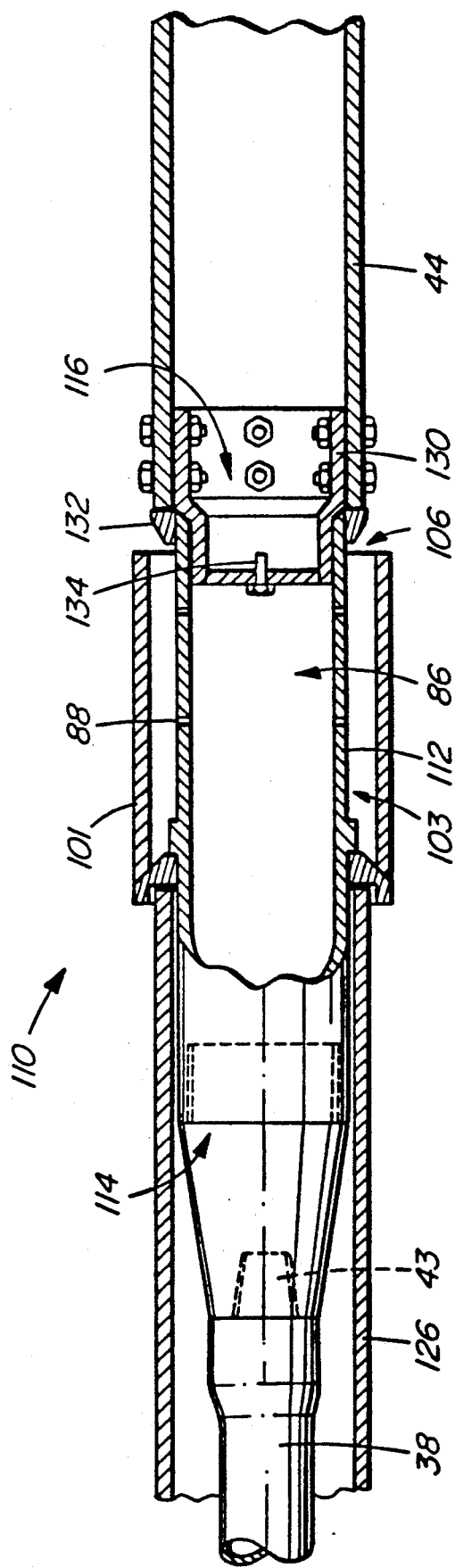
FIG. 17 is another side view of the tool of FIG. 15 but showing the tool in a combined pipe extraction and pipe laying application.

Referring now to FIGS. 16 and 17, a tool 110 is illustrated for use when the pipe being replaced is not broken up but extracted from the ground before laying the new pipe, such as in the case of a metal pipe. The tool 110 comprises a cylindrical member 112 having screw threaded openings 114 and 116 at its opposite ends.

When using the tool 110, extraction of the old pipe 126 and laying of the new pipe 44, can be performed in one operation, as shown in FIG. 17, or in two stages, as will be described below with reference to FIG. 16.

With the one-stage operation, a pipe attachment member 130 is screwed into the opening 116. The new pipe 44 is bolted to the attachment member 130 behind a wear ring 132 which is provided on the cylindrical body 112 of the tool 110. The new pipe 44 is then laid by pulling the tool 110 through from the insertion pit 42 while pushing the old pipe 126 out ahead of it. The pushing out operation will be described in more detail below.

The tool 110 can be provided with a chamber 86 therein, as shown in FIG. 17, to accommodate a dressing material, should this be required in a particular application. Ports 88 are provided for the exit of dressing material therethrough and the attachment member 130 can be provided with an inlet 134 for a dressing material, as shown. A sleeve 101 to form an annular space 103 around the ports 88 can also be provided.

The two-stage process comprises a first step by which the old pipe 126 is pushed out by the tool 110 from the jacking pit 40 towards the insertion pit 42 or a service connection pit and a second step by which the new pipe 44 is pulled along using the other tool 70 on a return journey from the insertion pit 42 to the jacking pit 40.

In carrying out the first step, a guide pipe 120 is screwed onto the end 114 and a connection member 119 is screwed to the other end 116 to which in turn is screwed the end of a pipe section 38, as shown in FIG. 16.

The tool 110 has a collar 124 around it for engaging with an end of the old pipe, indicated at 126, to be removed. For engagement with the collar 124 the flanged end of the old pipe 126 is first removed by sawing it off to provide a flangeless end, as shown at 128, which end 128 is received against the collar 124.

Thus the old pipe 126 is now pushed along in front of the tool 110 as the tool 110 is advanced as a result of the successive strokes performed by the hydraulic cylinder 34 of the hydraulic unit 10. As the old pipe 126 emerges into the insertion pit 42 or a service connection pit, it is crushed or broken up or sawn off in sections and removed bit by bit.

When the tool 110 has reached the insertion pit 42 and all the old pipe 126 has been removed, the tool 110 is removed and the tool 70 is attached with the new pipe as described above.

The method described above can also be used for installing a new pipe in a situation where the new pipe is laid in sections and each section is inserted underground by pushing it ahead of the tool 110. The arrangement will then be similar to that shown in FIG. 16, except that, instead of the old pipe 126, it will be a new pipe section (not shown) which is engaged by the front of the tool 110. A sleeve 101, as shown in FIG. 17, can then also be provided in circumstances where a lubricant or filler material is to be applied.

The tool 110 can also be provided with a vibrator as in the case of the tool 70. In addition to decreasing friction on the tool 110, the vibrator decreases friction on the old pipe 126 during extraction thereof. The tool 110 may also be used in conjunction with a cushion sub as in the case of the tool 70.

While only preferred embodiments of the invention have been described herein in detail, the invention is not limited thereby and modifications can be made within the scope of the attached claims.

What is claimed is;

1. A hydraulic apparatus comprising:
a stationary frame portion;

a moving frame portion capable of performing sliding movement relative to said stationary frame portion between a pair of limiting positions;

hydraulic cylinder means between said stationary and said moving frame portions for effecting movement of said moving frame portion between said limiting positions;

connection means on said movable frame portion for connection to a stem attached to a pipe removing tool; and gripping and rotating means associated with said movable frame portion comprising a number of opposing members for gripping a stem therebetween and including means on the opposing member for rotating the stem when engaged by said opposing members to effect assembly of said stem from individual screw-threaded stem portions or disassembly of the stem into said individual stem portions.

2. The hydraulic apparatus according to claim 1, wherein said stem portions comprise heavy wall high tensile steel tubing.

3. The hydraulic apparatus according to claim 1, wherein said hydraulic cylinder means comprises four hydraulic cylinders which are symmetrically arranged with respect to said connection means.

4. The hydraulic apparatus according to claim 3, wherein said connection means comprises a slip bowl or bushing for a set of slips.

5. The hydraulic apparatus according to claim 1, wherein said number of opposing members comprises a pair of jaws which are movable between an open position and a closed position and said means on the opposing members for rotating the stem comprises a plurality of rollers on the jaws which are arranged for gripping the stem between said rollers when the jaws are in the closed position and further comprising means for driving the rollers to rotate the stem.

* * * * *